(12) United States Patent
Nishiyama

(10) Patent No.: US 11,127,118 B2
(45) Date of Patent: Sep. 21, 2021

(54) IMAGE PROCESSING APPARATUS, IMAGE PICKUP APPARATUS, CONTROL METHOD TO CONTROL AN IMAGE PROCESSING APPARATUS, AND STORAGE MEDIUM

(71) Applicant: CANON KABUSHIKI KAISHA, Tokyo (JP)

(72) Inventor: Marina Nishiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 16/534,413

(22) Filed: Aug. 7, 2019

(65) Prior Publication Data
US 2020/0065944 A1 Feb. 27, 2020

(30) Foreign Application Priority Data
Aug. 22, 2018 (JP) .............................. JP2018-155608

(51) Int. Cl.
| | | |
|---|---|---|
| G06T 7/70 | (2017.01) | |
| G06T 5/00 | (2006.01) | |
| G06T 7/50 | (2017.01) | |
| G06T 1/20 | (2006.01) | |

(52) U.S. Cl.
CPC ................ *G06T 5/003* (2013.01); *G06T 1/20* (2013.01); *G06T 7/50* (2017.01); *G06T 7/70* (2017.01)

(58) Field of Classification Search
CPC .. G06T 7/50; G06T 7/70; G06T 5/003; G06T 5/50; G06T 1/20
See application file for complete search history.

(56) References Cited

U.S. PATENT DOCUMENTS

| | | | | |
|---|---|---|---|---|
| 2008/0052321 | A1* | 2/2008 | Nakase | H04N 1/2158 |
| 2008/0063254 | A1* | 3/2008 | Tanizaki | G06T 7/0004 |
| | | | | 382/141 |
| 2008/0259176 | A1* | 10/2008 | Tamaru | G03B 13/32 |
| | | | | 348/222.1 |
| 2009/0074284 | A1* | 3/2009 | Zeineh | G02B 21/367 |
| | | | | 382/133 |
| 2009/0086891 | A1* | 4/2009 | Ofuji | A61B 6/463 |
| | | | | 378/37 |

(Continued)

FOREIGN PATENT DOCUMENTS

| | | |
|---|---|---|
| JP | 2013115798 A | 6/2013 |
| JP | 2014017539 A | 1/2014 |

(Continued)

*Primary Examiner* — Carol Wang
(74) *Attorney, Agent, or Firm* — Canon U.S.A., Inc. IP Division

(57) ABSTRACT

An image processing apparatus includes at least one memory configured to store instructions; and at least one processor in communication with the at least one memory and configured to execute the instructions to: acquire a plurality of images having angles of view that at least partially overlap each other and varying in in-focus positions, and information corresponding to each of the plurality of images; determine a rearrangement method for rearranging the plurality of images in order of the in-focus positions based on the information; rearrange the plurality of images using the rearrangement method; and generate a combined image by extracting areas in focus from the plurality of images and performing the combining based on the extracted areas.

14 Claims, 7 Drawing Sheets

(56) References Cited

U.S. PATENT DOCUMENTS

| | | | | |
|---|---|---|---|---|
| 2010/0177967 | A1* | 7/2010 | Lee | G06F 16/5838 |
| | | | | 382/218 |
| 2013/0038723 | A1* | 2/2013 | Tsutsumi | H04N 5/23212 |
| | | | | 348/139 |
| 2018/0084192 | A1* | 3/2018 | Suzuki | H04N 5/23212 |
| 2018/0286020 | A1* | 10/2018 | Kawai | H04N 5/23229 |
| 2019/0139239 | A1* | 5/2019 | Yasutomi | G06T 3/0075 |
| 2019/0199920 | A1* | 6/2019 | Matsunaga | H04N 5/232123 |

FOREIGN PATENT DOCUMENTS

| | | |
|---|---|---|
| JP | 2015-216532 A | 12/2015 |
| JP | 2018-37857 A | 3/2018 |

\* cited by examiner

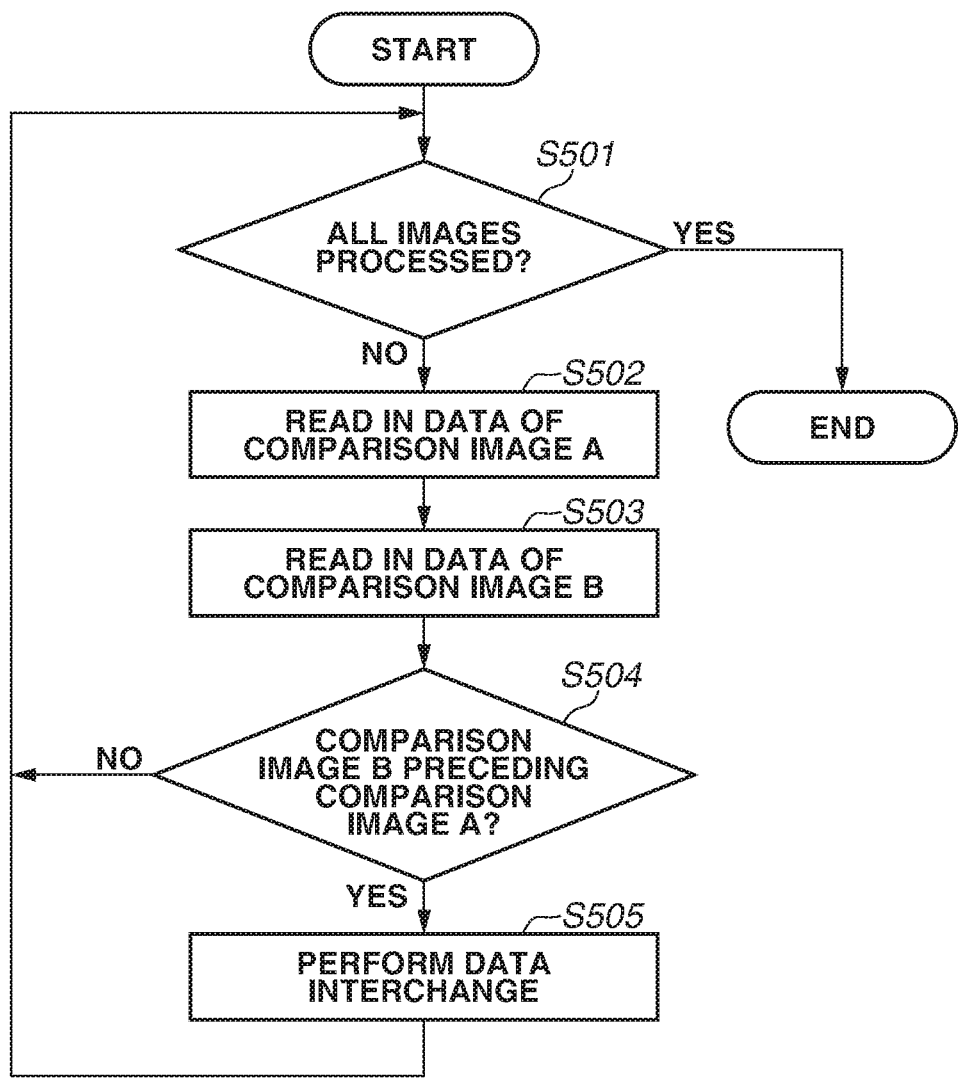

REAR IN-FOCUS IMAGE

FRONT IN-FOCUS IMAGE

COMBINED IMAGE

IMAGE PICKUP COMPOSITION

AREA WHERE FRONT OBJECT AND REAR OBJECT OVERLAP EACH OTHER

IMAGE PROCESSING APPARATUS, IMAGE PICKUP APPARATUS, CONTROL METHOD TO CONTROL AN IMAGE PROCESSING APPARATUS, AND STORAGE MEDIUM

BACKGROUND

Field of the Disclosure

The present disclosure generally relates to image processing and, more particularly, to an image processing apparatus, an image pickup apparatus, a control method to control an image processing apparatus, and a storage medium that combines a plurality of images having various in-focus positions.

Description of the Related Art

In a case where an image of a plurality of objects greatly varying in distances is picked up by using a camera such as a digital camera, or in a case where an image of an object that is long in a depth direction is picked up, focusing may be achieved only in some of objects or a part of an object because of an insufficient depth of field. To address such a problem, Japanese Patent Application Laid-Open No. 2015-216532 discusses a so-called depth combining technology. In this technology, a plurality of images varying in in-focus positions is picked up, only in-focus areas are extracted from the respective images, and the extracted images are combined into one image, so that a combined image in which the focusing is achieved in the entire image pickup area is generated. In Japanese Patent Application Laid-Open No. 2015-216532, an area having the highest contrast value among areas at the same positions in the respective images is an in-focus area.

In performing the combining by using the technology discussed in Japanese Patent Application Laid-Open No. 2015-216532, it is often necessary to recognize information about an order of picked-up images, in order to generate a combined image of high quality. For example, Japanese Patent Application Laid-Open No. 2018-37857 discusses a technology for adjusting a composite ratio so that an object at the back is not seen through the front object in the depth combining. In order to correctly implement the technology discussed in Japanese Patent Application Laid-Open No. 2018-37857, it is necessary to recognize the front-back relationship of an object, i.e., it is necessary to recognize the order of picked-up images.

In general, information about the order of picked-up images is recorded in association with the picked-up images during image pickup. The combining is performed for the picked-up images, while the information about the order of the picked-up images is being read out.

However, the depth combining cannot be performed by using the method discussed in Japanese Patent Application Laid-Open No. 2018-37857, if the information about the order of the picked-up images is not correctly recorded or lost during the depth combining. Therefore, if the depth combining is to be performed by using the method discussed in Japanese Patent Application Laid-Open No. 2018-37857, it is necessary to rearrange (sort) the picked-up images correctly.

SUMMARY

The present disclosure is directed to an image processing apparatus capable of sorting images that are picked up for depth combining.

According to an aspect of the present disclosure, an image processing apparatus includes at least one memory configured to store instructions; and at least one processor in communication with the at least one memory and configured to execute the instructions to: acquire a plurality of images having angles of view that at least partially overlap each other and varying in in-focus positions, and information corresponding to each of the plurality of images; determine a rearrangement method for rearranging the plurality of images in order of the in-focus positions based on the information; rearrange the plurality of images using the rearrangement method; and generate a combined image by extracting areas in focus from the plurality of images and performing combining based on the extracted areas.

According to the configuration of the present disclosure, an image processing apparatus that sorts images picked up to perform depth combining can be provided.

Further features of the present disclosure will become apparent from the following description of exemplary embodiments with reference to the attached drawings.

BRIEF DESCRIPTION OF THE DRAWINGS

FIG. 5 is a flowchart illustrating bubble sort in the exemplary embodiment of the present disclosure.

DESCRIPTION OF THE EMBODIMENTS

Various exemplary embodiments, features, and aspects of the present disclosure will be described in detail below with reference to the attached drawings.

Figure 1:
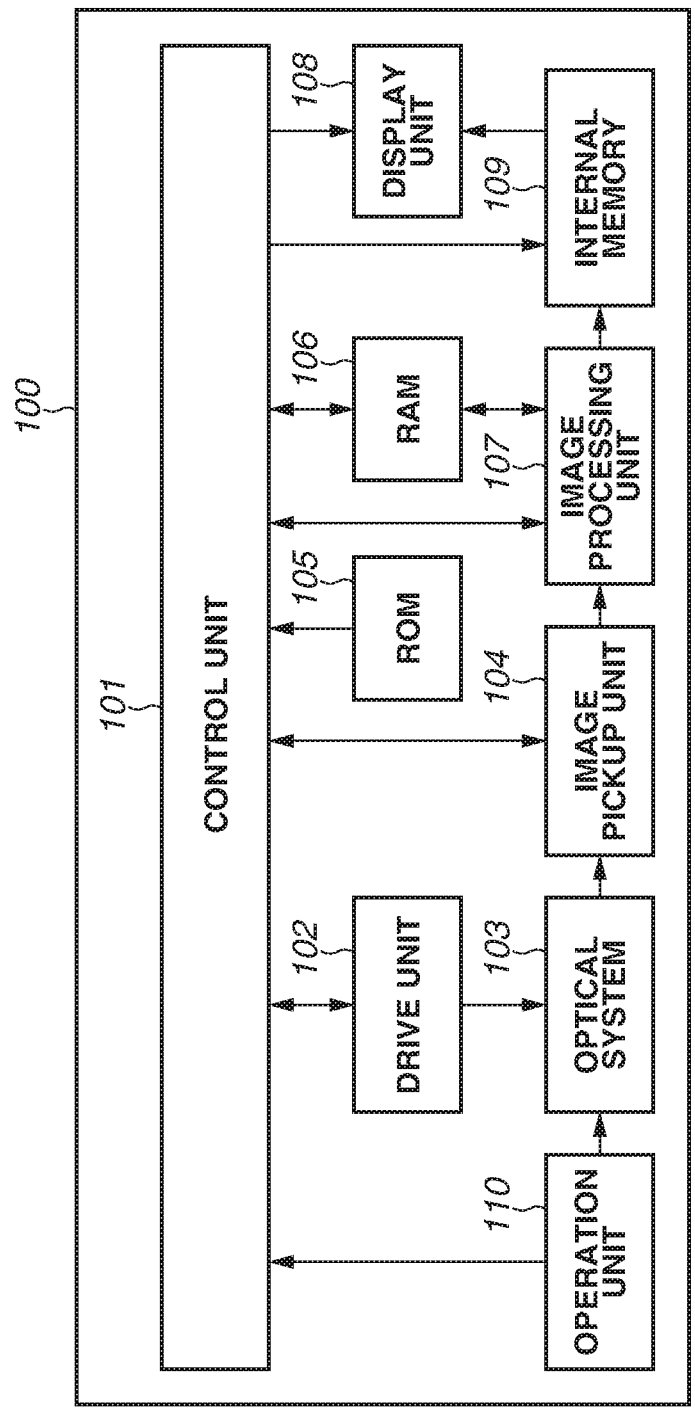
FIG. 1 is a block diagram illustrating a structure of a digital camera according to an exemplary embodiment of the present disclosure.

FIG. 1 is a block diagram illustrating a structure of a digital camera serving as an image processing apparatus according to the present exemplary embodiment. A digital camera 100 can pick up a still image and record information indicating an in-focus position. The digital camera 100 can perform calculation of a contrast value and combine images. Further, the digital camera 100 can perform enlargement processing or reduction processing, for a saved picked-up image or an image input from outside.

A control unit 101, which may include one or more processors, one or more memories, circuitry, or a combination thereof, for example, may be a signal processor such as a central processing unit (CPU), a micro processing unit (MPU), or the like. The control unit 101 may control each unit of the digital camera 100, while reading out a program stored beforehand in a read only memory (ROM 105) as described below. For example, as will be described below, the control unit 101 issues a command for start and end of image pickup to an image pickup unit 104 to be described below. Alternatively, the control unit 101 issues a command for image processing to an image processing unit 107 to be described below, based on the program stored in the ROM 105. A command made by a user is input into the digital camera 100 via an operation unit 110 to be described below, and reaches each unit of the digital camera 100 via the control unit 101.

A drive unit 102 includes a motor, and mechanically operates an optical system 103 to be described below, based on a command from the control unit 101. For example, based on the command from the control unit 101, the drive unit 102 moves the position of a focus lens included in the optical system 103 and thereby adjusts the focal length of the optical system 103.

The optical system 103 includes a zoom lens, the focus lens, and a diaphragm. The diaphragm is a mechanism that adjusts the quantity of transmitting light. An in-focus position can be changed by changing a lens position. The in-focus position in the present exemplary embodiment is an in-focus position in an optical axis direction, unless otherwise specified. An image pickup distance can be acquired during image pickup in a case where a proper type of the lens provided in the optical system 103 is used.

The image pickup unit 104 has an image pickup element such as a complementary metal oxide semiconductor (CMOS) sensor. The image pickup unit 104 photoelectrically converts an optical image formed in the image pickup element by the optical system 103, and outputs an image signal obtained thereby. The image signal is output as a pair of image signals obtained when light beams passing through different areas on an exit pupil of the optical system 103 are received respectively.

The ROM 105 is a read-only nonvolatile memory serving as a storage medium, and stores, in addition to an operation program for each block included in the digital camera 100, data such as parameters necessary for the operation of each block. A random access memory (RAM) 106 is a rewritable volatile memory, and is used as a temporary storage area for data output in the operation of each block included in the digital camera 100.

The image processing unit 107 performs addition of a pair of image data, and reconfigures an image signal obtained when a light beam passing through the entire area on the exit pupil of the optical system is received. Further, the image processing unit 107 can generate a distance map by acquiring information related to a distance distribution of an object from the pair of image data. The distance map is, for example, data in which an image pickup distance is recorded for each pixel.

The image processing unit 107 performs various kinds of image processing, on the image generated by performing the addition of the pair of image data, the distance map, and data of an image signal recorded an internal memory 109 to be described below. The kinds of image processing include white balance adjustment, color interpolation, filtering, and compression processing based on a standard such as Joint Photographic Experts Group (JPEG).

The image processing unit 107 may be configured as an integrated circuit (an application specific integrated circuit (ASIC)) in which circuits each performing specific processing are integrated. Alternatively, the control unit 101 may perform some or all of the functions of the image processing unit 107, by reading out a program from the ROM 105 and performing processing based on the read-out program. In a case where the control unit 101 performs all of the functions of the image processing unit 107, it is not necessary to provide the image processing unit 107 as hardware.

A display unit 108 includes a liquid crystal display and an organic electroluminescence (EL) display for displaying, for example, an image temporarily saved in the RAM 106, an image saved in the internal memory 109 to be described below, or a setting screen of the digital camera 100.

In the internal memory 109, for example, the image picked up by the image pickup unit 104, the distance map, the image subjected to the processing performed by the image processing unit 107, and the information indicating the in-focus position at the time of image pickup are recorded. A memory card may be used in place of the internal memory.

The operation unit 110 may be, for example, a button, a switch, a key, or a mode dial attached to the digital camera 100, or a touch panel that the display unit 108 doubles as. A command provided by the user reaches the control unit 101 via the operation unit 110.

Figure 2:
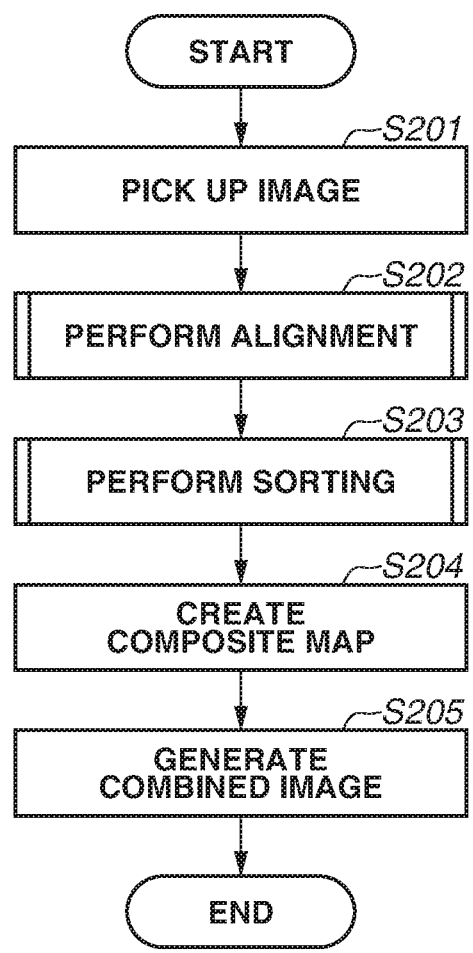
FIG. 2 is a flowchart illustrating generation of a composite image in the exemplary embodiment of the present disclosure.

FIG. 2 is a flowchart illustrating generation of a combined image in the present exemplary embodiment.

In step S201, the digital camera 100 picks up an image. For example, the user designates an in-focus position via the touch panel that the display unit 108 doubles as, and designates a plurality of in-focus positions at regular intervals from the front to the back in an optical axis direction of the in-focus positions. The image pickup unit 104 then performs image pickup at the designated plurality of in-focus positions. It is preferable that the digital camera 100 perform the image pickup at the same angle of view without moving, but there is a case where the angle of view slightly varies due to a variation in the in-focus position. The internal memory 109 stores the picked-up image by adding a file name, and stores related data of the picked-up image in association with the image as well. Examples of the related data include a distance map, an image pick-up time, a focal distance when an image is picked up. The related data saved together with the image can be changed according to the setting by the user.

In step S202, the control unit 101 performs alignment for the images picked by the image pickup unit 104 in step S201.

Figure 3:
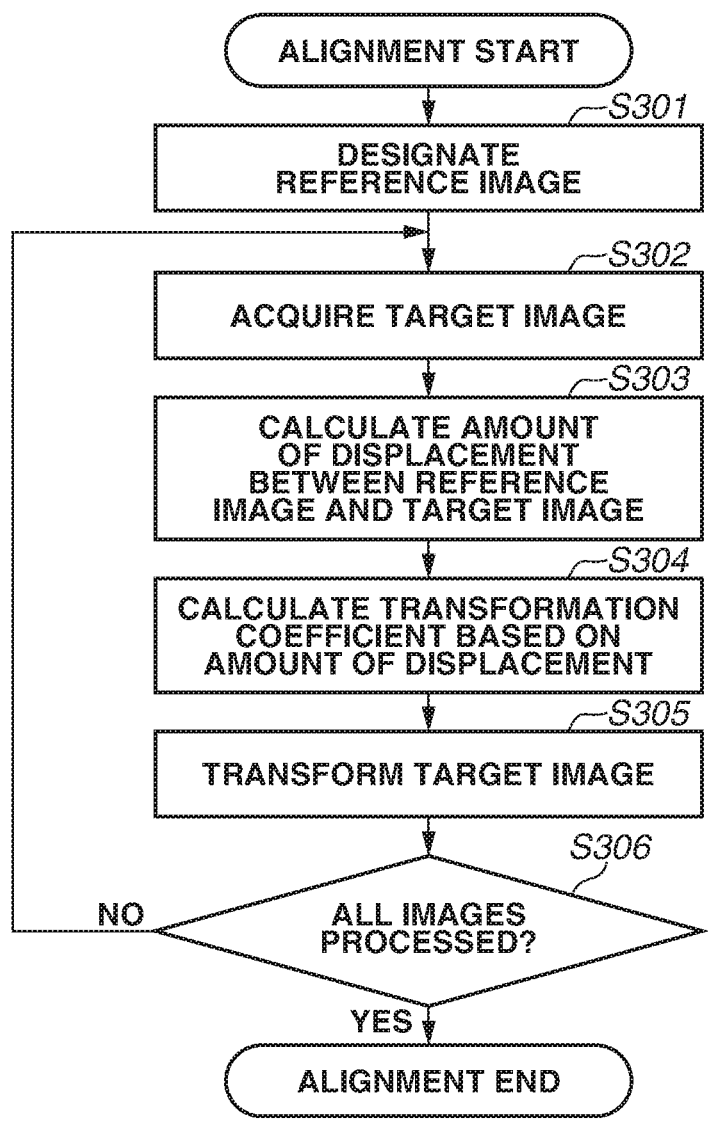
FIG. 3 is a flowchart illustrating alignment in the exemplary embodiment of the present disclosure.

FIG. 3 is a flowchart illustrating alignment in the present exemplary embodiment.

In step S301, the control unit 101 designates a reference image for alignment, from among the images picked up by the image pickup unit 104 in step S201.

In step S302, the control unit 101 acquires a target image for the processing of the alignment. The target image is an image which is not the reference image designated in step S301, and has not yet been subjected to the processing of the alignment.

In step S303, the control unit 101 calculates an amount of positional displacement between the reference image and the target image. An example of a method for the calculation will be described below. First, the control unit 101 sets a plurality of blocks to the reference image. It is preferable that the control unit 101 make the setting of the blocks so that the sizes of the respective blocks are the same. Next, the control unit 101 sets a search range of the target image, at the same position as that of each of the blocks of the reference image. The search range is wider than the block of the reference image. Finally, the control unit 101 calculates a corresponding point in each of the search ranges of the target image where a sum of absolute difference (hereinafter referred to as SAD) of luminance with respect to the block of the reference image is a minimum. The control unit 101 calculates the positional displacement in step S303 as a vector, based on the center of the block of the reference image and the above-described corresponding point. The control unit 101 may use a sum of squared difference (SSD) or a normalized cross correlation (NCC) other than the SAD, in the above-described calculation of the corresponding point.

In step S304, the control unit 101 calculates a transformation coefficient, based on the amount of the positional displacement between the reference image and the target image. The control unit 101 uses, for example, a projective transformation coefficient, as the transformation coefficient. However, the transformation coefficient is not limited to the projective transformation coefficient, and an affine transformation coefficient or a simplified transformation coefficient based on only a horizontally perpendicular shift may be used.

In step S305, the image processing unit 107 performs transformation on the target image, using the transformation coefficient calculated in step S304.

For example, the control unit 101 can perform the transformation using the following expression (1).

$$I' = \begin{pmatrix} x' \\ y' \\ 1 \end{pmatrix} = AI = \begin{pmatrix} a & b & c \\ d & e & f \\ 0 & 0 & 1 \end{pmatrix} \cdot \begin{pmatrix} x \\ y \\ 1 \end{pmatrix} \quad (1)$$

In the expression (1), (x', y') represents coordinates after the transformation is performed, and (x, y) represents coordinates before the transformation is performed. A matrix A represents the transformation coefficient calculated by the control unit 101 in step S304.

In step S306, the control unit 101 determines whether the alignment (processing) is performed on all the images except for the reference image. If the alignment is performed on all the images except for the reference image (YES in step S306), the processing in this flowchart ends. If there is an image that has not yet been subjected to the alignment (NO in step S306), the processing returns to step S302.

In step S203, the control unit 101 performs rearrangement of the order of the images picked up by the image pickup unit 104 in step S201, i.e., the control unit 101 performs sorting. The sorting will be described in detail below.

In step S204, the image processing unit 107 creates a composite map.

As an example, specifically, the image processing unit 107 first calculates a contrast value for each of the images (including the reference image) that have been subjected to the alignment. The contrast value is calculated by, for example, the following method. First, the image processing unit 107 calculates a luminance Y using the following expression (2), based on color signals Sr, Sg, and Sb of each pixel.

$$Y = 0.299Sr + 0.587Sg + 0.114Sb \quad (2)$$

Next, a contrast value I is calculated by using a Sobel filter, as expressed in the following expressions (3) to (5), for a matrix L of the luminance Y of 3 by 3 pixels.

$$I_h = \begin{pmatrix} -1 & 0 & 1 \\ -2 & 0 & 2 \\ -1 & 0 & 1 \end{pmatrix} \cdot L \quad (3)$$

$$I_v = \begin{pmatrix} -1 & -2 & -1 \\ 0 & 0 & 0 \\ 1 & 2 & 1 \end{pmatrix} \cdot L \quad (4)$$

$$I = \sqrt{I_h^2 + I_v^2} \quad (5)$$

The above-described method for calculating the contrast value is only an example, and other types of filters can be used. Examples of other types of filters include an edge-detection filter such as a Laplacian filter, a band-pass filter that passes frequencies in a predetermined bandwidth, or the like.

Next, the image processing unit 107 may create such a composite map that a composite ratio of 100% is applied to an area having the highest contrast value among the corresponding areas of the respective images. However, here, it may be practical to consider an influence such as a perspective conflict as will be described in detail below.

In step S205, the image processing unit 107 generates a combined image, based on the composite map created in step S204. As for the composite ratio calculated in the manner described above, if the composite ratio varies from 0% to 100% (or varies from 100% to 0%) between adjacent pixels, the combining border is noticeably unnatural. Therefore, a filter having a predetermined number of pixels (taps) is applied to the composite map so that a sharp variation in the composite ratio between the adjacent pixels is prevented.

Next, sorting in step S203 will be described.

Figure 4:
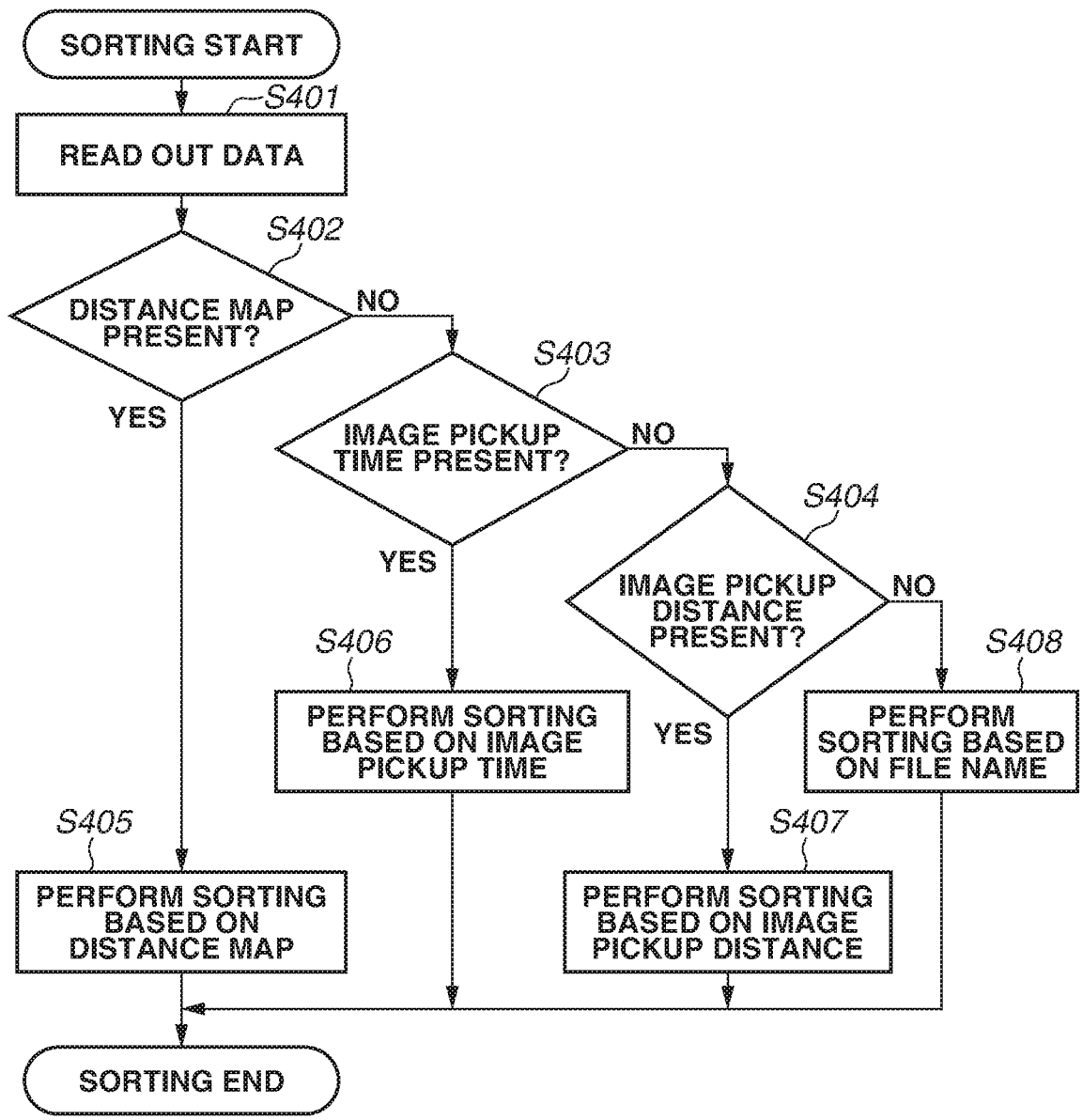
FIG. 4 is a flowchart illustrating sorting in the exemplary embodiment of the present disclosure.

FIG. 4 is a flowchart illustrating sorting in the present exemplary embodiment.

In step S401, the control unit 101 reads out data from the internal memory 109. The data described here is, for example, the image picked up in step S201, and the related data saved when the image is picked up. In step S402, the control unit 101 determines whether a distance map is included in the recorded data. An exact in-focus position can be estimated by using the distance map. If the distance map is recorded (YES in step S402), the processing proceeds to step S405. If the distance map is not recorded (NO in step S402), the processing proceeds to step S403. In step S405, the control unit 101 performs sorting based on the distance map so that the in-focus positions are located from the front to the back, and records the result of the sorting in association with the images in the internal memory 109.

Specifically, at first, the control unit 101 determines an in-focus area of each of the images. In other words, an area where focus is achieved within a frame of one image is determined. For example, when picking up an image, the user designates an in-focus area via the touch panel that the display unit 108 doubles as, and if information about the in-focus area is recorded together with the image, an in-focus position may be determined by using such information.

However, if information of an in-focus area is not recorded when an image is picked up, the in-focus area of the image may be determined by calculating contrast values of the entire frame and determining an area having the highest contrast value as the in-focus area. This is one of a method for determining the in-focus area of the image. If the contrast value is already calculated in step S202, the calculated contrast value may be used. Next, the control unit 101 determines an in-focus position of each of the images while comparing the in-focus area of each of the images with the distance map. Finally, the control unit 101 sorts the images in order of in-focus position. However, such a method for determining the in-focus area can be inaccurate, and if this method is used, it may be necessary to lower the priority level of the method for using the distance map.

In step S403, the control unit 101 determines whether a precise image pick-up time is recorded. Usually, the order in which image pickup is performed while the in-focus position is shifted is the order of images to be input for the combination, in many cases. However, in many cases, picking up images while moving the in-focus position is performed at a high speed, and there is a case where an image pickup sequence cannot be distinguished. Therefore, an image pickup time that is precise enough to distinguish such a sequence is required. If the precise image pickup time is recorded (YES in step S403), the processing proceeds to step S406. If the precise image pickup time is not recorded (NO in step S403), the processing proceeds to step S404. In step S406, the control unit 101 performs sorting in the order of time at which image pickup is performed, based on the precise image pickup time, and the control unit 101 records the result of the sorting in association with the images in the internal memory 109. The reason for performing the sorting using the image pickup time is as follows. In many cases, when the image pickup is performed while an in-focus position of each of a plurality of images is being changed, the in-focus position is changed in one direction, without reciprocating. Therefore, the order of the image pickup time may be considered as the order of the in-focus positions.

If the precise image pick-up time is not held, in step S404, the control unit 101 determines whether image pickup distance information is recorded. The image pick-up distance described here is a distance stored along with the image picked-up in a case where a lens that enables recording of an image pickup distance is used. If the image pickup distance information is recorded (YES in step S404), the processing proceeds to step S407. If the image pickup distance information is not recorded (NO in step S404), the processing proceeds to step S408. In step S407, the control unit 101 performs sorting in the order of image pickup distances, based on the image pickup distance information, and records the result of the sorting in association with the images in the internal memory 109.

If the image pickup distance information is not recorded, in step S408, the control unit 101 performs sorting in the order of file names based on the file names, and records the result of the sorting in the internal memory 109.

In the above description, the sorting is performed as an example based on the priority levels, by using data such as the distance map, the image pickup time, the image pickup distance, and the file name. However, the type and the priority level of the data to be used depend on the type and the accuracy of the recorded data. Therefore, it is also conceivable that, for example, different kinds of data are appropriately combined and used, or the priority level is changed. For example, as described above, in a case where the distance map is used, the accuracy decreases if the in-focus area is determined by using the contrast value. Therefore, the distance map is not preferentially used.

Examples of the method for the sorting performed in step S405 to S408 include bubble sort, heap sort, and quick sort. Next, the bubble sort among these examples will be described.

FIG. 5 is a flowchart illustrating bubble sort in the present exemplary embodiment.

First, in step S501, the control unit 101 determines whether rearrangement processing has been performed on all the input images. If the rearrangement processing has been performed on all the input images (YES in step S501), the rearrangement processing ends. If the rearrangement processing has not been performed on all the input images (NO in step S501), the processing proceeds to step S502. Subsequently, adjacent images in the input order are compared, starting from the top. Here, of the two adjacent images, the former image in the order is a comparison image A, and the latter image in the order is a comparison image B. In step S502, the control unit 101 reads in data of the comparison image A from the internal memory 109. In step S503, the control unit 101 reads in data of the comparison image B from the internal memory 109. The data described here is information about the order of the images described above.

Next, in step S504, the control unit 101 determines whether the comparison image B precedes the comparison image A, based on the read-in data. If the comparison image B precedes the comparison image A (YES in step S504), the processing proceeds to step S505. In step S505, the control unit 101 performs a data interchange between the comparison image A and the comparison image B and thereby interchanges the respective positions in the order. If the comparison image A precedes the comparison image B (NO in step S504), the processing does not proceed to step S505 and thus, the data interchange processing is not performed. Finally, the adjacent image is moved one image backward, so that the processing restarts from step S501. The processing in these steps is performed on all the images, so that the in-focus positions are sorted to be located from the front to the back.

In creating an image by depth combining, there is a case where it is necessary to recognize the front-back in-focus positional relationship between picked-up images to be used for the combining, in order to generate a highly precise combined image. For example, as will be described below, in performing a technology for preventing a perspective conflict in which a rear object is seen through a front object, the sorting is required if the order of picked-up images is not correct.

Figure 6C:
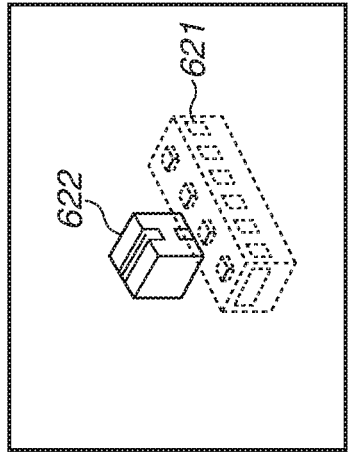
FIGS. 6A to 6E are diagrams illustrating a perspective conflict in the exemplary embodiment of the present disclosure.
Figure 6B:
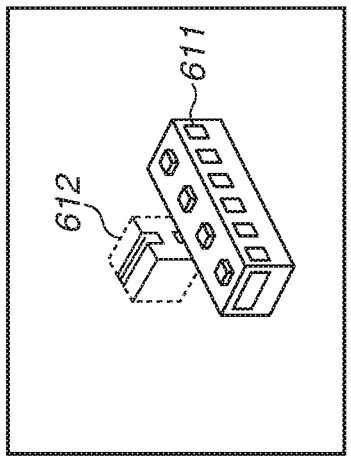
Figure 6E:
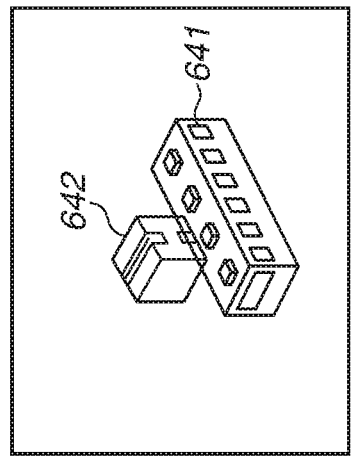
Figure 6A:
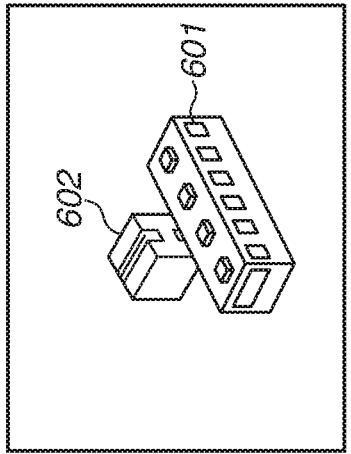
Figure 6D:
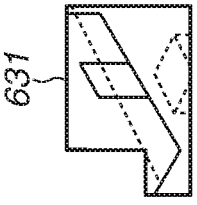

FIGS. 6A to 6E are diagrams illustrating the perspective conflict. In FIGS. 6A to 6E, a plurality of objects varying in distance from a camera is present at the same position in an image. FIG. 6A is image pickup composition including a front object 601 and a rear object 602. FIG. 6B is a diagram illustrating a picked-up image when the front object 601 is in focus. FIG. 6C is a diagram illustrating a picked-up image when the rear object 602 is in focus. FIG. 6D is a diagram illustrating an area where the front object 601 and the rear object 602 overlap each other. In a case where the front object 601 is in focus as illustrated in FIG. 6B, the rear object 602 is hidden behind the front object 601. On the other hand, in a case where the rear object 602 is in focus as illustrated in FIG. 6C, the front object 601 blurs and thus the rear object 602 is seen through. In a case where the contrast value of the rear object 602 in the in-focus state is higher than the contrast value of the front object 601 in the in-focus state, the rear object is output as illustrated in FIG. 6E, if the depth combining is attempted. Therefore, a combined image in which a part of a front object is lost is generated.

Figure 7:
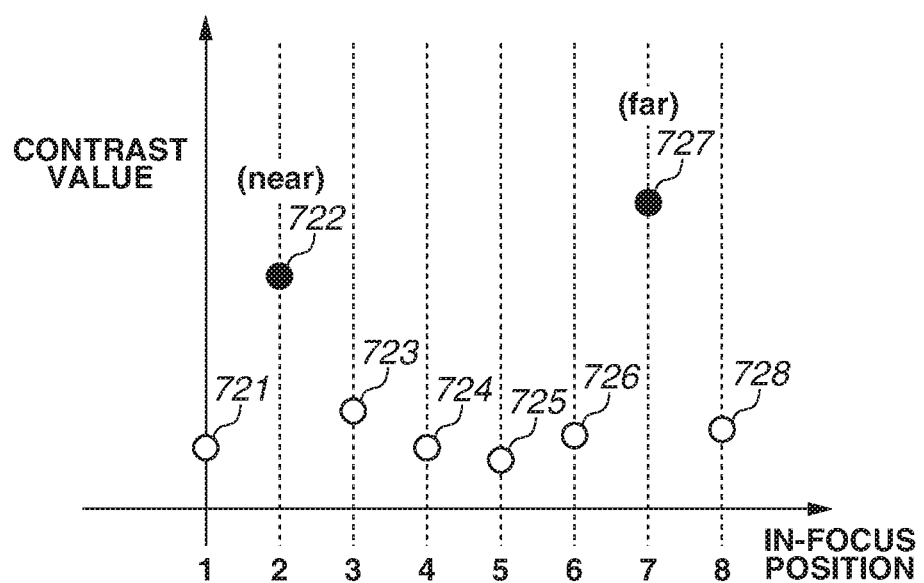
FIG. 7 is a graph illustrating a relationship between contrast value and in-focus position in the perspective conflict in the exemplary embodiment of the present disclosure.

To detect such a perspective conflict, a technology is conceivable that detects a relative maximum from the relationship between contrast value and in-focus position in the corresponding areas of a series of images, and determines the perspective conflict based on the relative maximum. FIG. 7 is a graph illustrating the relationship between the contrast value and the in-focus position in the perspective conflict in the present exemplary embodiment. FIG. 7 illustrates a state where the contrast value is a maximum at in-focus position numbers 2 and 7. Because the contrast value is the maximum at each of the in-focus position numbers 2 and 7, if a composite ratio of 100% is simply applied to positions where the contrast value is a maximum, a rear object located at the in-focus position number 7 is seen through to the front, as described above. To address such a problem, the rear object is prevented from being seen through to the front by, for example, increasing the relative maximum of the contrast value of a near in-focus position, when the image processing unit 107 creates a combined image. In other words, the composite ratio of 100% is applied to the position of the in-focus position number 2.

To perform the above-described method, it may be practical to correctly grasp information indicating the in-focus position of the picked-up image. If the method for sorting as described with reference to step S203 is not used, the front-back relationship of an object may not be acquired, and the above-described method for reducing the perspective conflict cannot be performed.

In addition, in the method described above, the display unit 108 may display the used method for the sorting and the information of the related data.

According to the present exemplary embodiment, the information recorded in association with the picked-up image to be used for the depth combining is utilized, and even when the information related to the order of the picked-up images is lost, the picked-up images can be correctly rearranged.

Other Exemplary Embodiments

In the above-described exemplary embodiments, the description is given based on the digital camera for personal use. However, the exemplary embodiments are applicable also to an apparatus such as a portable device, a smartphone, or a network camera connected to a server, if the apparatus has a function of performing depth combining. Alternatively, a part of the above-described processing may be performed by an apparatus such as a portable device, a smartphone, or a network camera connected to a server.

The present disclosure can also be implemented by supplying a program that implements one or more functions of the above-described exemplary embodiment to a system or apparatus via a network or storage medium, and causing one or more processors in a computer of the system or apparatus to execute processing by reading out the program. The present disclosure can also be implemented by a circuit (e.g., ASIC) for implementing one or more functions.

According to the configuration of the present exemplary embodiments of the present disclosure, an image processing apparatus that sorts images picked up for depth combining can be provided.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-155608, filed Aug. 22, 2018, which is hereby incorporated by reference herein in its entirety.

What is claimed is:

1. An image processing apparatus comprising:
at least one memory configured to store instructions; and
at least one processor in communication with the at least one memory and configured to execute the instructions to:
acquire a plurality of images having angles of view that at least partially overlap each other and varying in in-focus positions, and information corresponding to each of the plurality of images;
determine a rearrangement method for rearranging the plurality of images in order of the in-focus positions based on the information;
rearrange the plurality of images using the rearrangement method;
generate a combined image by extracting areas in focus from the plurality of images and performing combining based on the extracted areas; and determine a composite ratio based on a contrast value of each of corresponding areas, and increase a composite ratio of an area at an in-focus position on a front side among areas having a plurality of local maxima of contrast values.

2. The image processing apparatus according to claim 1, wherein the at least one processor further executes the instructions to perform the combining based on an order of in-focus positions of the plurality of images.

3. The image processing apparatus according to claim 1, wherein the information is at least one of a distance map, an image pickup time, an image pick-up distance, and a file name.

4. The image processing apparatus according to claim 3, wherein the at least one processor further executes the instructions to rearrange the plurality of images by using the distance map preferentially.

5. The image processing apparatus according to claim 1, wherein the at least one processor further executes the instructions to rearrange the plurality of images by using bubble sort, heap sort, or quick sort.

6. The image processing apparatus according to claim 1, further comprising a display configured to display the rearrangement method.

7. The image processing apparatus according to claim 1, wherein the at least one processor further executes the instructions to perform the combining by extracting an area having a highest contrast value among the corresponding areas in respective images.

8. The image processing apparatus according to claim 7, wherein the at least one processor further executes the instructions to perform alignment on the plurality of images, and
wherein the corresponding areas are areas at same positions in the respective images after the alignment is performed.

9. The image processing apparatus according to claim 7, wherein the at least one processor further executes the instructions to detect areas having a plurality of local maxima, in a case where contrast values of the corresponding areas are arranged in order of the plurality of images after rearranging is performed.

10. The image processing apparatus according to claim 9, the at least one processor further executes the instructions to determine a composite ratio of 100% as the composite ratio of an area at the in-focus position on the front side among the areas having the plurality of local maxima of the contrast values.

11. The image processing apparatus according to claim 1, wherein the at least one processor further executes the instructions to detect a perspective conflict, based on an order of the plurality of images after rearranging is performed.

12. An image pickup apparatus comprising:
an image sensor configured to pick up a plurality of images having angles of view that at least partially overlap each other, and varying in in-focus position; at least one memory configured to store instructions; and
at least one processor in communication with the at least one memory and configured to execute the instructions to:
acquire information corresponding to each of the plurality of images;
determine a rearrangement method for rearranging the plurality of images in order of in-focus position based on the information;
rearrange the plurality of images by using the rearrangement method;
generate a combined image by extracting areas in focus from the plurality of images and performing the combining based on the extracted areas; and
determine a composite ratio based on a contrast value of each of corresponding areas, and increase a composite ratio of an area at an in-focus position on a front side among areas having a plurality of local maxima of contrast values.

13. A control method to control an image processing apparatus, the method comprising:
acquiring a plurality of images having angles of view that at least partially overlap each other, and varying in in-focus positions, and information corresponding to each of the plurality of images;
determining a rearrangement method for rearranging the plurality of images in order of in-focus positions based on the information;
rearranging the plurality of images by using the rearrangement method;
generating a combined image by extracting areas in focus from the plurality of images and performing combining based on the extracted areas; and
determining a composite ratio based on a contrast value of each of corresponding areas, and increase a composite ratio of an area at an in-focus position on a front side among areas having a plurality of local maxima of contrast values.

14. A storage medium storing instructions that cause a computer to execute a method for controlling an image processing apparatus, the method comprising:
acquiring a plurality of images having angles of view that at least partially overlap each other, and varying in in-focus positions, and information corresponding to each of the plurality of images;
determining a rearrangement method for rearranging the plurality of images in order of in-focus positions based on the information;
rearranging the plurality of images by using the rearrangement method;
generating a combined image by extracting areas in focus from the plurality of images and performing combining based on the extracted areas; and
determining a composite ratio based on a contrast value of each of corresponding areas, and increase a composite ratio of an area at an in-focus position on a front side among areas having a plurality of local maxima of contrast values.

* * * * *